March 8, 1966 G. C. SMITH ETAL 3,238,915
VALVE POSITION INDICATOR
Filed Feb. 14, 1964 2 Sheets-Sheet 1
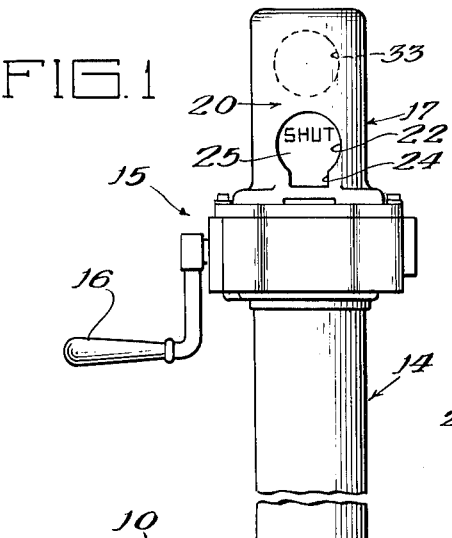
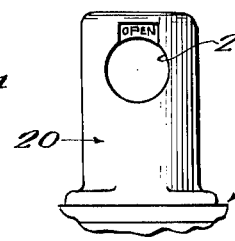
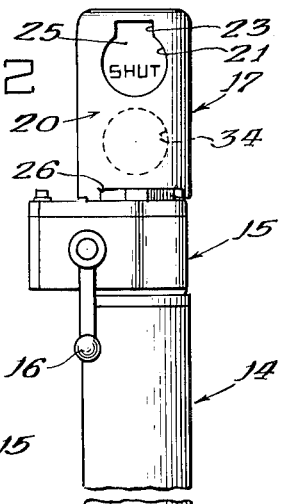
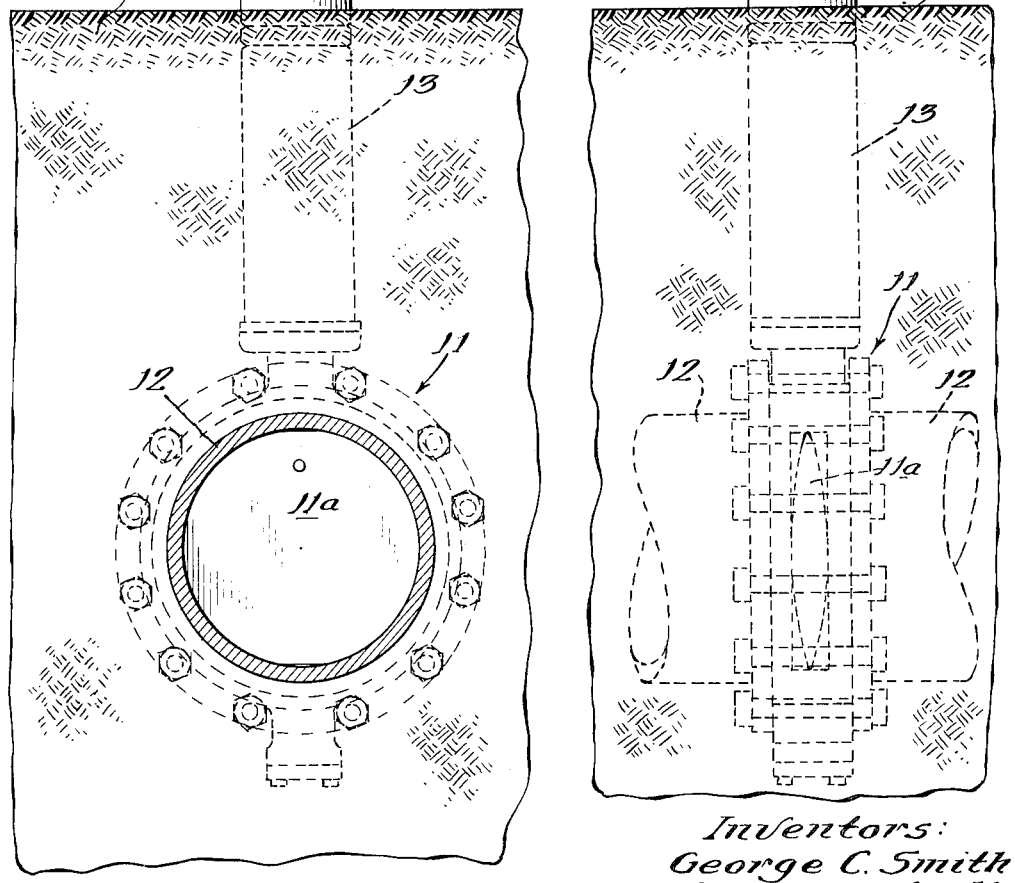
Inventors:
George C. Smith
William J. Woolley
By: Hofgren, Wegner, Allen,
Stellman & McCord
Attorneys March 8, 1966 G. C. SMITH ETAL 3,238,915
VALVE POSITION INDICATOR
Filed Feb. 14, 1964 2 Sheets-Sheet 2
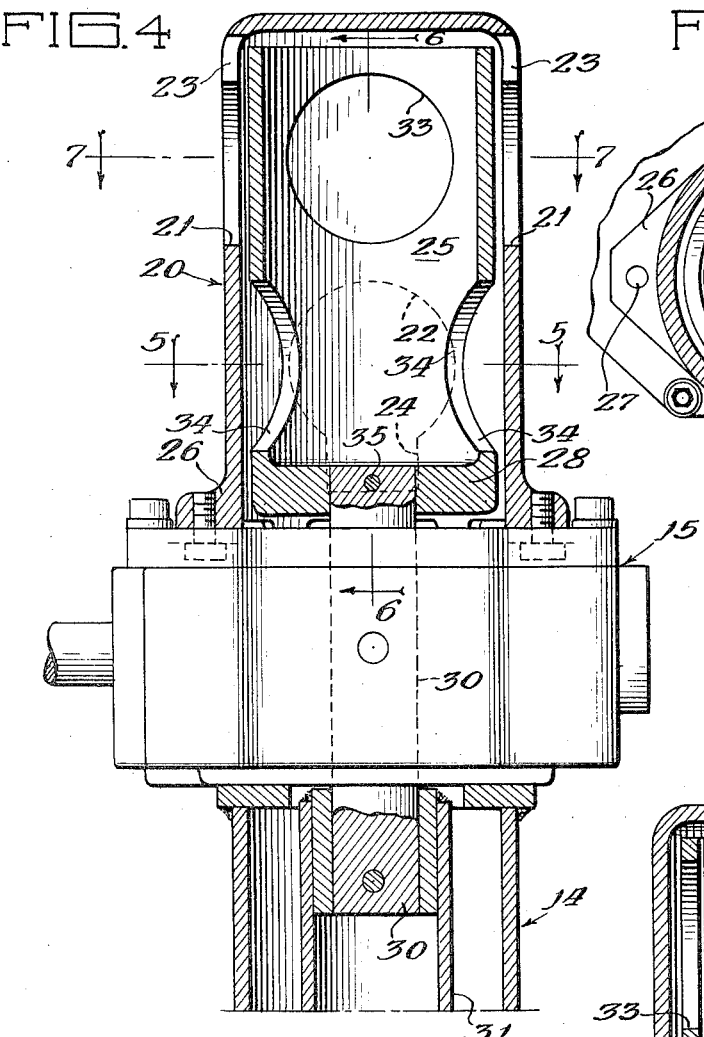
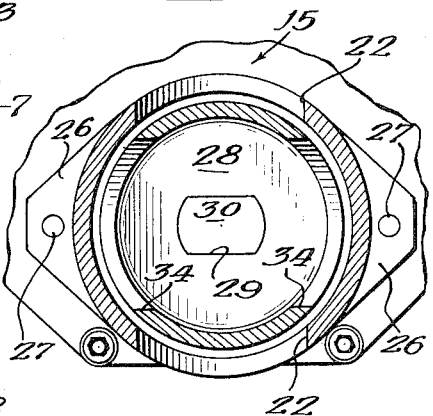
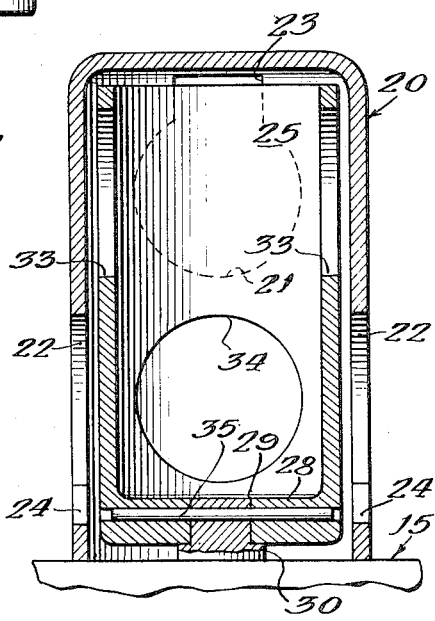
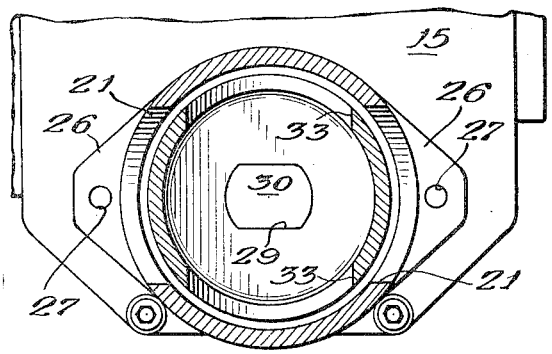

United States Patent Office 3,238,915
Patented Mar. 8, 1966

3,238,915
VALVE POSITION INDICATOR
George C. Smith, Islington, Mass., and William J. Wooley, Oak Park, Ill., assignors to Henry Pratt Company, a corporation of Illinois
Filed Feb. 14, 1964, Ser. No. 345,038
8 Claims. (Cl. 116—125)

This invention relates to a valve indicator and more particularly to an indicator which gives a visual indication of the position of the valve either open or closed or a position between these extremes.

The particular indicator of this invention has a mode of operation useful with many types of valves. The particular embodiment to be described is one which is made for use with a butterfly valve which opens and closes with 90° of rotation. Generally, the indicator has a part which moves with the closure of the valve adjacent a stationary part, the two parts together providing the visual indication of the valve position.

One particular use for the present indicator is in connection with the valves controlling water lines to the sprinkler systems of manufacturing plants, offices, warehouses and the like. Valve indication in such a use is particularly important because of the cost involved in weekly inspection of such valves. It has been shown that the cost of weekly inspections may be materially reduced by the use of the present indicator because of its readily recognizable information concerning the valve condition and its high visibility from a considerable distance. Studies have indicated that the new indicator has a highly recognizable means of conveying information about the valve conditions and this also contributes to a saving in inspection time.

It is the principal object of this invention to provide a new and improved valve indicator.

Another object is to provide an indicator for a valve operating upon a new principle of visual indication.

Another object is to provide a valve indicator which may cut the cost of inspection of valve positions by materially reducing the time required by personnel to make the inspection.

Another object is to provide an indicator which makes positive the identification of the indicator reading.

A further object is to provide a valve indicator in which the valve position observation is possible from a greater distance with certainty.

Other objects, features and advantages of the present invention will be understood from the following description of a preferred embodiment illustrated in the accompanying drawings, in which:

FIGURE 1 is an elevational view of the indicator of this invention mounted upon a riser and valve operator connected to a valve in a pipeline shown in dotted outline below grade;

FIGURE 2 is a view similar to FIGURE 1 taken at 90° to the view of FIGURE 1;

FIGURE 3 is a fragmentary elevational view of the indicator in the position of FIGURE 1 showing the indicator position when the valve is open;

FIGURE 4 is an elevational view partly in section on an enlarged scale compared with FIGURE 1 but still smaller than full size showing the parts of the indicator;

FIGURE 5 is a horizontal sectional view through the indicator taken substantially along line 5—5;

FIGURE 6 is an upright central sectional view through the indicator taken along line 6—6 in FIGURE 4; and FIGURE 7 is a horizontal sectional view through the upper part of the indicator taken substantially along line Referring to FIGURES 1 to 3, the indicator of this invention is shown as mounted upon a butterfly type valve for controlling a water pipeline entering a building and conducting water to the sprinkler system of that building. Ordinarily, such valves are installed outside of the building, perhaps in a separate enclosure so that in the event of fire, the sprinklers may be turned off after the fire is out. The pipeline carrying the water into the building is generally below the ground 10 and is controlled by a butterfly valve 11 inserted between two sections of pipe 12 and 12 (FIGURE 2). The control for opening and closing the valve extends upwardly through a riser 13 having a portion 14 extending above grade. An operator 15 for opening and closing the valve is mounted upon the riser and may be provided with a turning handle 16 for opening and closing the valve. The indicator mechanism 17 is mounted above the operator 15. In general, the indicator includes an outer housing 20 generally enclosing the indicator. In the wall of the outer housing are a pair of opposite upper openings 21 and 90° removed therefrom a pair of opposite lower openings 22. Each of these openings is generally round, the upper openings having a keyhole portion 23 extending upwardly and the lower openings having a keyhole portion 24 extending downwardly. An inner member or rotor 25 is visible through the openings in the outer housing 20.

In general, the indicator of the present invention operates upon a principle of providing a see-through opening through the indicator to indicate a valve open position. Research tests have indicated the see-through opening provides a readily recognizable symbol indicating that the valve is open. The openings are blocked against the ability to see through them to indicate a valve closed position. Basically, the indicator has two parts, an inner member and an outer member, and a means of providing relative movement of the members to bring openings into alignment or to move them out of alignment. While the present invention is illustrated in connection with a rotation of one of the two members, other valves may utilize a longitudinal movement or a movement of one or the other of the members or both of the members to provide the relative movement.

Referring to the details of the indicator illustrated in FIGURES 4 to 7, it may be noted that the outer member 20 is a closed cylindrical member open at its lower end and equipped with a flange 26 on opposite sides and a bolt opening 27 by which the housing may be attached to the upper side of the operator 15. In this embodiment the outer housing substantially encloses the operator.

The inner member 25 is an upwardly open, cylindrical hollow member with an integral lower wall 28 in which there is broached a central opening 29 for the reception of a shaft 30 attached to the drive shaft 31 extending downwardly through the riser to an operative connection with the valve. Each of the members has a relatively thin cylindrical wall so that the inner member may turn within the stationary outer member.

In the position of FIGURE 4 the upper openings 21 in the outer member are opposite the blank wall of the inner member 25. If desired, the inner member may include the legend "shut" shown in FIGURES 1 and 2. In addition to not being able to see through the openings, the appearance of the lettering within the round part of the opening will assure the observer that the valve indication is a valve closed position. It is contemplated that the legend is unnecessary and tests have proven that the intelligence of valve indication is given without the necessity of the legends.

Also in FIGURE 4 it may be noted that the lower openings 22 in the outer member are also opposite the blank wall portion of the inner member 25. The inner member is provided with round openings in a plane to align with the round part of the openings in the outer housing. Thus, the inner member is provided with a pair of round diametrically opposite openings 33 for alignment with the openings 21 in the housing. Similarly, at a lower level the inner member is provided with round openings 34 for alignment with the lower openings 22 in the housing. The relative positions of the openings are readily visible in FIGURES 5 and 7 showing how the openings may be opposite a blank wall portion of the other member. As further shown in FIGURE 6, the inner member may be pinned as by a pin 35 extending through the base wall 28 and the shaft 30 so as to be sure of rotation with the valve.

When the valve is moved to an open position, the inner member or rotor will turn directly proportionally to the movement of the valve closure. This is possible in a butterfly valve by coupling the rotor directly to the operating shaft of the valve, since the valve turns but 90°. When the rotor has moved with the valve to an open position, the round holes will align with the round part of the keyholes in the housing. If desired, a legend may appear in the keyhole such as the legend "open" shown in FIGURE 3. Here again, it is believed unnecessary to have a legend as tests have shown that the fact of being able to look through a unobstructed passage as provided by the aligned openings gives the intelligence that the indicator is showing a valve open position. It is the ability to have an unobstructed see-through passage through the indicator or a blocked passage which gives the indication. By having two sets of openings in the indicator 90° apart as above described, the indicator may be viewed from various directions with accuracy. In an indicator about 10" high and 6" in diameter, it has been found that accurate readings from a distance of up to 100' can easily be made by ordinary inspectors.

The foregoing detailed description has been given for clearness of understanding only and no unnecessary limitations should be understood therefrom as some modifications will be obvious to those skilled in the art.

We claim:
1. An indicator for remotely disclosing the open and closed positions of a valve, comprising: an inner member, an outer member about the inner member, each member having a wall portion and means forming a visibly open passage therethrough, the passages being located with respect to each other so as to be capable of being positioned in alignment to provide a common visually unobstructed opening through both members simultaneously, the wall portions being capable of being positioned to visibly close the passages when the passages are not in alignment, and means for mounting the members upon the valve so as to operatively connect at least one of the members to the valve to provide relative rotation between the inner member and the outer member as the valve is moved between an open position and a closed position, the passages of the outer member and the inner member being aligned when the valve is in its open position and the passages being obstructed by the wall portions when the valve is in its closed position.

2. An indicator as specified in claim 1, in which the inner member and the outer member are each cylindrically shaped, and the means for mounting the members upon the valve includes securing means on the outer member for attaching the outer member to a stationary portion of the valve and connecting means on the inner member for connecting the inner member to a movable portion of the valve thereby to provide relative rotation between the inner member and the outer member to visibly indicate valve position.

3. An indicator as specified in claim 1, in which each member has a wall portion and means forming a pair of visibly open passages therethrough, the passages in each member being located about 90° apart and being positioned so as to be capable of alignment to provide two common visually unobstructed openings which are substantially 90° apart when the valve is in its open position.

4. An indicator as specified in claim 1, in which the passage in the outer member is keyhole shaped and the passage in the inner member is generally round and aligned with the round portion of the keyhole passage in the outer member so as to provide for high visibility of the relative position of said members.

5. An indicator for a valve permitting observation of valve position between open and closed positions, comprising: a pair of members positioned in facing relationship, each member having a wall portion and means forming a visibly open passage therethrough, and means for mounting said members upon a valve including connecting means for securing at least one of said members to the valve for movement with respect to the other member as the valve is moved between its open and its closed position, said members being positioned in respect to each other so that the passages are aligned to provide a visually unobstructed opening through both members when the valve is in open position, and so that the wall portions visually obstruct said passages when the valve is in closed position.

6. A valve position indicator for observation of valve position, comprising: a hollow housing having a base for attachment to a non-rotating portion of a valve, said housing having a cylindrical wall with first diametrically opposite openings in the wall adjacent the base and second diametrically opposite openings in the wall spaced about 90° from the first openings and longitudinally of the housing out of registry with the first openings; a hollow rotor within the housing having a wall closely adjacent the housing wall, said rotor having a base and means for securing the rotor to a movable valve portion so as to rotate as the valve is moved between an open position and a closed position, said rotor wall having openings therein positioned in alignment with the openings in said housing to provide unobstructed see-through passages in two directions about 90° apart when the valve is in open position, the housing wall and the rotor wall visually obstructing the openings in the housing and the rotor when the valve is in closed position.

7. An indicator for a valve permitting observation of valve position between open and closed positions, comprising: a pair of relatively movable members one within the other, each of said members having a wall portion provided with a see-through opening, the movement of the members being in proportion to the movement of the valve between valve open and valve closed positions and the members being positioned in respect to each other so that the openings of the members are aligned to provide a visually unobstructed passage through both members when the valve is in open position and so that the wall portions visually obstruct the openings when the valve is in closed position, and means for connecting at least one of the relatively movable members to the valve so that movement of the valve is proportionately transmitted to the relatively movable members to remotely indicate the valve position.

8. An indicator for a valve permitting observation of valve position between open and closed positions, comprising: a first member and a second member positioned in facing relationship, each member having a wall portion, the wall portion of the first member having a visibly open passage therethrough, said members being positioned so that the wall portion of the second member visually obstructs the passage of the first member when the valve is in closed position and so that the wall portion of the second member does not visually obstruct the passage of the first member when the valve is in open position, and means for mounting said members upon a valve including connecting means for securing at least one of the members to the valve to provide movement relative to the other of the members as the valve is moved between its open position and its closed position.

References Cited by the Examiner

UNITED STATES PATENTS

| | | | |
|---|---|---|---|
| 130,838 | 8/1872 | Blackburn | 116—125 |
| 630,278 | 8/1899 | Wiley | 116—125 |
| 824,163 | 1/1906 | Whitney | 116—125 |
| 951,927 | 3/1910 | Whitney | 116—125 |
| 1,201,894 | 10/1916 | Thompson | 116—125 |
| 1,386,065 | 8/1921 | Lofton | 116—125 |

References Cited by the Applicant

UNITED STATES PATENTS

| | | |
|---|---|---|
| 2,251,320 | 8/1941 | Brisbane. |
| 2,407,944 | 8/1946 | Bassett. |
| 2,443,036 | 6/1948 | Hopkins. |
| 2,827,914 | 3/1958 | Alters. |
| 2,919,885 | 1/1960 | Daigle. |
| 2,959,149 | 11/1960 | Schwenk. |
| 3,043,160 | 7/1962 | Killian. |

LOUIS J. CAPOZI, *Primary Examiner.*

LEO SMILOW, *Examiner.*